(12) United States Patent
Shuck et al.

(10) Patent No.: US 11,629,412 B2
(45) Date of Patent: Apr. 18, 2023

(54) COLD SPRAY DEPOSITED MASKING LAYER

(71) Applicants: Rolls-Royce Corporation, Indianapolis, IN (US); Rolls-Royce plc, London (GB)

(72) Inventors: Quinlan Yee Shuck, Indianapolis, IN (US); Scott Nelson, Indianapolis, IN (US); Martyn Anthony Jones, London (GB); Peter E. Daum, Indianapolis, IN (US)

(73) Assignees: Rolls-Royce Corporation, Indianapolis, IN (US); Rolls-Royce plc, London (GB)

( * ) Notice: Subject to any disclaimer, the term of this patent is extended or adjusted under 35 U.S.C. 154(b) by 0 days.

(21) Appl. No.: 17/551,480

(22) Filed: Dec. 15, 2021

(65) Prior Publication Data

US 2022/0186381 A1    Jun. 16, 2022

Related U.S. Application Data

(60) Provisional application No. 63/126,280, filed on Dec. 16, 2020.

(51) Int. Cl.
*C23C 24/04*         (2006.01)
*B33Y 70/00*         (2020.01)
(Continued)

(52) U.S. Cl.
CPC .............. *C23C 24/04* (2013.01); *B33Y 10/00* (2014.12); *B33Y 40/10* (2020.01); *B33Y 70/00* (2014.12)

(58) Field of Classification Search
CPC ......... B33Y 10/00; B33Y 70/00; B33Y 40/10; B05D 1/322; B05D 1/325; B05D 1/327; C23C 24/04; C93C 2218/355
See application file for complete search history.

(56) References Cited

U.S. PATENT DOCUMENTS 3,854,842 A    12/1974 Caudill
4,073,599 A     2/1978 Allen et al.
(Continued)

FOREIGN PATENT DOCUMENTS

EP    1466718 A2    10/2004
EP    1674658 A1     6/2006
(Continued)

OTHER PUBLICATIONS

Yin et al., "Cold Spray Additive Manufacturing and Repair: Fundamentals and Applications," Additive Manufacturing, vol. 21, May 2018, pp. 628-650.
(Continued)

*Primary Examiner* — Nathan T Leong
(74) *Attorney, Agent, or Firm* — Shumaker & Sieffert, P.A.

(57) ABSTRACT

A method may include cold spraying a masking material on selected locations of a component to form a masking layer, wherein the masking material comprises a metal or alloy; additively manufacturing an additively manufactured portion of the component at locations at which the masking layer is not present; and removing the masking layer from the component. The masking layer may be configured to protect portions of the component by covering or otherwise providing a physical barrier that reduces or prevents material from adhering to unwanted portions of the component during a subsequent manufacturing and/or repair technique. Additionally, the masking layer may be reflective to infrared radiation and/or intimately contact the component and function as a heat sink or thermally conductive layer to transfer heat from the component.

9 Claims, 4 Drawing Sheets

(51) Int. Cl.
*B33Y 40/10* (2020.01)
*B33Y 10/00* (2015.01)

(56) References Cited

U.S. PATENT DOCUMENTS

| | | |
|---|---|---|
| 4,214,355 A | 7/1980 | Zelahy |
| 4,232,995 A | 11/1980 | Stalker et al. |
| 4,247,254 A | 1/1981 | Zelahy |
| 4,390,320 A | 6/1983 | Eiswerth |
| 4,411,597 A | 10/1983 | Koffel et al. |
| 5,038,014 A | 8/1991 | Pratt et al. |
| 5,183,385 A | 2/1993 | Lee et al. |
| 5,478,537 A | 12/1995 | Laughlin et al. |
| 5,479,704 A | 1/1996 | Richter et al. |
| 5,554,837 A | 9/1996 | Goodwater et al. |
| 6,122,564 A | 9/2000 | Koch et al. |
| 6,146,476 A | 11/2000 | Boyer |
| 6,172,327 B1 | 1/2001 | Aleshin et al. |
| 6,269,540 B1 | 8/2001 | Islam et al. |
| 6,326,585 B1 | 12/2001 | Aleshin et al. |
| 6,376,211 B1 | 4/2002 | Little et al. |
| 6,459,951 B1 | 10/2002 | Griffith et al. |
| 6,502,303 B2 | 1/2003 | Updegrove et al. |
| 6,553,275 B1 | 4/2003 | Mazumder |
| 6,588,103 B2 | 7/2003 | Fernihough et al. |
| 6,811,379 B2 | 11/2004 | Fernihough et al. |
| 7,001,151 B2 | 2/2006 | Wang et al. |
| 7,043,330 B2 | 5/2006 | Toyserkani et al. |
| 7,278,829 B2 | 10/2007 | Roedl et al. |
| 7,286,893 B1 | 10/2007 | Mazumder |
| 7,423,236 B2 | 9/2008 | Suh |
| 7,472,478 B2 | 1/2009 | Graham et al. |
| 7,587,818 B2 | 9/2009 | Gorman et al. |
| 7,600,977 B2 | 10/2009 | Shadbolt et al. |
| 7,704,565 B2 | 4/2010 | Slaughter |
| 7,765,022 B2 | 7/2010 | Mazumder et al. |
| 7,784,668 B2 | 8/2010 | Shubert |
| 7,984,547 B2 | 7/2011 | Steinhardt |
| 8,049,132 B2 | 11/2011 | Bouet et al. |
| 8,085,053 B2 | 12/2011 | Fried |
| 8,091,228 B2 | 1/2012 | Hiskes |
| 8,096,030 B2 | 1/2012 | Graichen |
| 8,383,985 B2 | 2/2013 | Twelves, Jr. et al. |
| 8,452,073 B2 | 5/2013 | Taminger et al. |
| 8,629,368 B2 | 1/2014 | Mazumder et al. |
| 8,684,790 B2 | 4/2014 | Reinmoeller et al. |
| 8,726,501 B2 | 5/2014 | Schoonover et al. |
| 8,875,392 B2 | 11/2014 | Richter |
| 8,996,156 B2 | 3/2015 | Melzer-Jokisch et al. |
| 9,044,827 B2 | 6/2015 | Song et al. |
| 9,061,375 B2 | 6/2015 | Qi et al. |
| 9,085,980 B2 | 7/2015 | Mittendorf et al. |
| 9,126,287 B2 | 9/2015 | Bruck et al. |
| 9,355,441 B2 | 5/2016 | Wersborg et al. |
| 9,943,933 B2 | 4/2018 | Xu et al. |
| 10,406,760 B2 | 9/2019 | Shuck et al. |
| 2001/0002287 A1 | 5/2001 | Kar et al. |
| 2003/0075836 A1 | 4/2003 | Fong |
| 2004/0133298 A1 | 7/2004 | Toyserkani et al. |
| 2004/0166187 A1 | 8/2004 | Fong |
| 2004/0200816 A1 | 10/2004 | Chung et al. |
| 2005/0023256 A1 | 2/2005 | Sankaranarayanan et al. |
| 2005/0040147 A1 | 5/2005 | Hoebel et al. |
| 2005/0133527 A1 | 6/2005 | Dullea et al. |
| 2006/0032840 A1 | 2/2006 | Bagavath-Singh |
| 2006/0054079 A1 | 3/2006 | Withey et al. |
| 2006/0193612 A1 | 8/2006 | Bouet et al. |
| 2007/0175875 A1 | 8/2007 | Uckelmann et al. |
| 2008/0135530 A1 | 6/2008 | Lee et al. |
| 2008/0173624 A1 | 7/2008 | Drechsler et al. |
| 2008/0178994 A1 | 7/2008 | Qi et al. |
| 2008/0201947 A1 | 8/2008 | Richter et al. |
| 2008/0257263 A1 | 10/2008 | Pavloff et al. |
| 2008/0296270 A1 | 12/2008 | Song et al. |
| 2008/0314878 A1 | 12/2008 | Cai et al. |
| 2009/0001059 A1 | 1/2009 | Spallek et al. |
| 2009/0024243 A1 | 1/2009 | Suh |
| 2010/0170878 A1 | 7/2010 | Krause |
| 2010/0176097 A1 | 7/2010 | Zhu |
| 2010/0257733 A1 | 10/2010 | Guo et al. |
| 2011/0061591 A1 | 3/2011 | Stecker |
| 2011/0069301 A1 | 3/2011 | Marzok et al. |
| 2011/0100964 A1 | 5/2011 | Burbaum et al. |
| 2011/0103967 A1 | 5/2011 | Hoebel et al. |
| 2011/0150636 A1 | 6/2011 | Tholen et al. |
| 2013/0104397 A1 | 5/2013 | Bunker |
| 2013/0178952 A1 | 7/2013 | Wersborg et al. |
| 2013/0228560 A1 | 9/2013 | Ume et al. |
| 2013/0298400 A1 | 11/2013 | Munshi et al. |
| 2014/0163717 A1 | 6/2014 | Das et al. |
| 2014/0259589 A1* | 9/2014 | Xu ............ F01D 5/34 29/402.01 |
| 2014/0339206 A1 | 11/2014 | Ott et al. |
| 2015/0040364 A1 | 2/2015 | Ogasahara et al. |
| 2015/0041025 A1 | 2/2015 | Wescott et al. |
| 2015/0048058 A1 | 2/2015 | Bruck et al. |
| 2015/0079306 A1 | 3/2015 | Schoeneborn et al. |
| 2015/0202717 A1 | 7/2015 | Bruck et al. |
| 2016/0303798 A1* | 10/2016 | Mironets ............ B22F 10/28 |
| 2018/0111197 A1 | 4/2018 | Romano et al. |
| 2018/0274104 A1* | 9/2018 | Reznik ............ C23C 24/04 |

FOREIGN PATENT DOCUMENTS

| | | |
|---|---|---|
| EP | 1701004 A1 | 9/2006 |
| EP | 1880793 A2 | 1/2008 |
| EP | 2014413 A1 | 1/2009 |
| EP | 2028342 A2 | 2/2009 |
| EP | 2586562 A2 | 5/2013 |
| GB | 2453945 A | 4/2000 |
| JP | 2004188451 A | 7/2004 |
| WO | 9208592 A1 | 5/1992 |
| WO | 0000921 A1 | 1/2000 |

OTHER PUBLICATIONS

Jang et al., "Neuro-Fuzzy Modeling and Control," Proceedings of the IEEE, vol. 83, No. 3 , Mar. 1995, 29 pp.

Song et al., "Control of Melt Pool Temperature and Deposition Height During Direct Metal Deposition Process," International Journal of Advanced Manufacturing Technology, vol. 58, May 27, 2011, pp. 247-256.

Tang et al., "Melt Pool Temperature Control for Laser Metal Deposition Processes—Part 1: Online Temperature Control, Journal of Manufacturing Science and Engineering", vol. 132, Feb. 2010, pp. 011010-1 to 011010-9.

Tang et al. "Variable Powder Flow Rate Control in Laser Metal Deposition Processes", University of Missouri-Rolla, Aug. 21, 2007, pp. 22-48.

U.S. Appl. No. 17/534,111, filed Nov. 23, 2021, naming inventors Nelson et al.

"LightSPEE3D 3D Metal Printer," accessed from https://www.spee3d.com/product/lightspee3d/, accessed on Dec. 13, 2021, 4 pp.

* cited by examiner

COLD SPRAY DEPOSITED MASKING LAYER

This application claims the benefit of U.S. Provisional Application Ser. No. 63/126,280, entitled "COLD SPRAY DEPOSITED MASKING LAYER", filed on Dec. 16, 2020, the entire content of which is incorporated herein by reference.

TECHNICAL FIELD

The disclosure relates to techniques for forming a masking layer on a component.

BACKGROUND

Integrally bladed disks, which may be called blisks, are used in low-pressure compressor (LPC) and high-pressure compressor (HPC) stages of gas turbine engines. The blisks may weigh less and have lower leakage than separate blades and disks, facilitating gas turbine engine efficiency. In some examples, multiple blisks may be metallurgically bonded or welded together to make blisk drums. Although this may further reduce component weight compared to separate blisks mechanically attached to each other, bonded or welded blisk drums may increase manufacturing and repair costs.

SUMMARY

In some examples, the disclosure describes a method that includes cold spraying a masking material on selected locations of a component to form a masking layer, wherein the masking material comprises a metal or alloy; additively manufacturing an additively manufactured portion of the component at locations at which the masking layer is not present; and removing the masking layer from the component.

The details of one or more examples are set forth in the accompanying drawings and the description below. Other features, objects, and advantages will be apparent from the description and drawings, and from the claims.

DETAILED DESCRIPTION

The disclosure describes systems and techniques for forming a masking layer on a component using cold spraying. The masking layer may be configured to protect portions of the component by covering or otherwise providing a physical barrier that reduces or prevents material from adhering to unwanted portions of the component during a subsequent manufacturing and/or repair technique. Additionally, the masking layer may be formed from a material that is reflective to infrared radiation, which may reflect heat from the subsequent manufacturing and/or repair process and reduce or prevent heating of the underlying component. Because the masking layer is deposited using cold spraying, the masking layer has intimate contact with the component, which may enable the masking layer to function as a heat sink or thermally conductive layer to transfer heat from the component during the manufacturing and/or repair process. Once the manufacturing and/or repair process is complete, the masking layer may be removed. Removal of the masking layer may be easier than removal of masking layers deposited using other techniques, since cold spray does not melt the target substrate.

In some examples, the masking layer may be used to mask a portion of a blisk during repair of a portion of the blisk. For example, the masking layer may be used during a directed energy deposition (DED) additive manufacturing process or other additive manufacturing process to repair a blade of the blisk. For example, during the additive manufacturing process for repairing a blade, a masking layer may be located around at least a portion of the perimeter of the partial blade (e.g., the portion of a blade that is attached to the rotor disk that remains after the damaged portion has been removed) defining the build surface. The masking layer may be configured to physically shield non-repaired areas of the blisk, such as portions of the partial blade adjacent the build surface, surfaces of neighboring blades, and/or other portions of the blisk such as the annulus between blades or blade filets.

Figure 1:
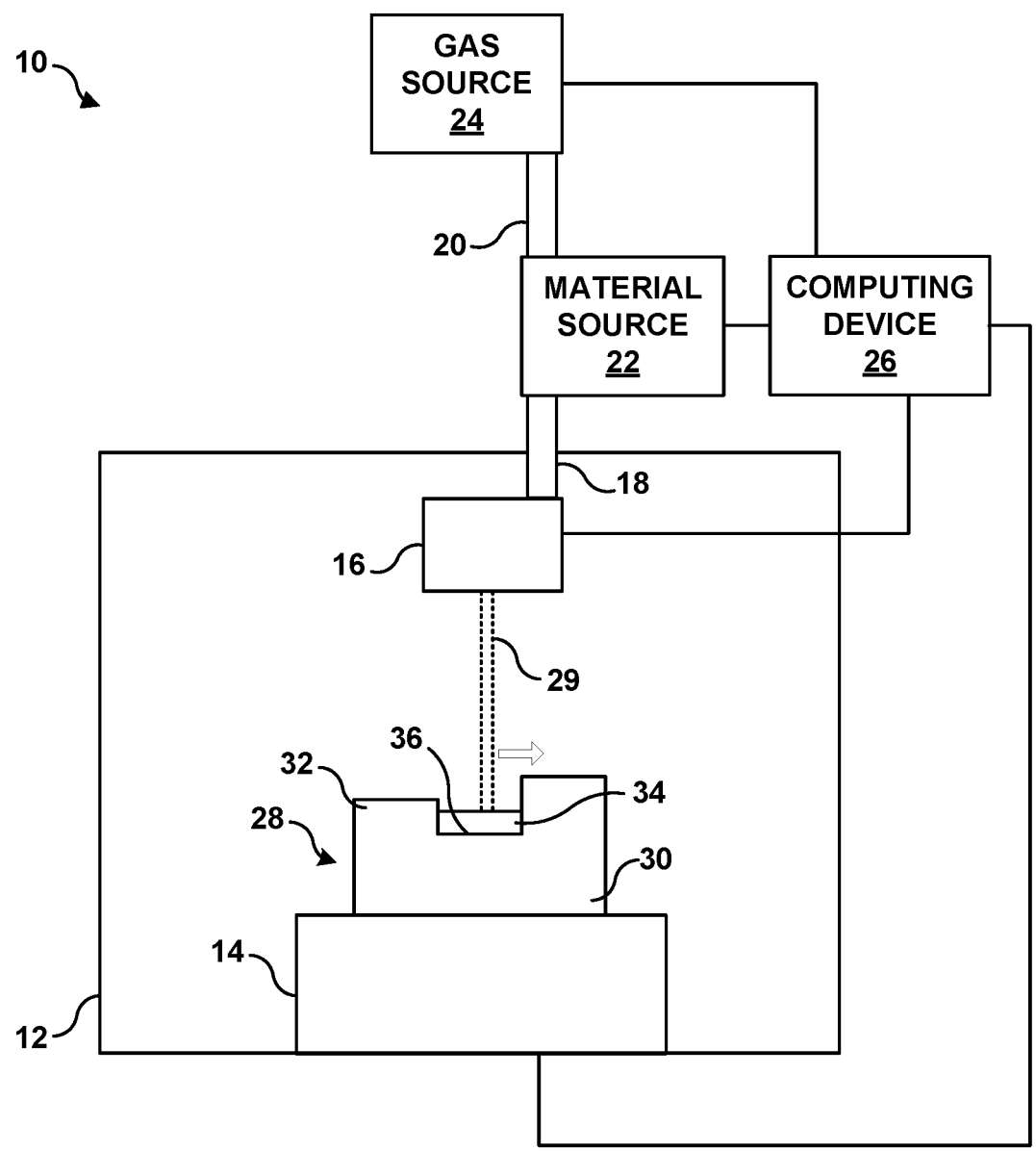
FIG. 1 is a conceptual and schematic diagram illustrating an example system for masking a component using cold spraying.

FIG. 1 is a conceptual and schematic diagram illustrating an example system 10 for forming a masking layer 34 on a component 28 using cold spraying. System 10 may include an enclosure 12, which encloses a stage 14, a cold spray gun 16, a material feed 18, and a gas feed 20. System 10 also may include a material source 22, which is operatively coupled to cold spray gun 16 via material feed 18, and a gas source 24, which is fluidly connected to material source 22 via gas feed 20. System 10 further may include a computing device 26, which may be communicatively connected to stage 14, cold spray gun 16, material feed 18, gas feed 20, material source 22, and/or gas source 24.

Component 28 is positioned within enclosure 12. In some examples, component 28 may include a component of a gas turbine engine, such as a blisk. As will be described herein, a blisk includes blades extending from a central rotor disk of the blisk. In some examples, a blisk may be used in a gas turbine engine. For example, a blisk may be used as compressor rotor or fan rotor in a gas turbine engine.

Figure 2:
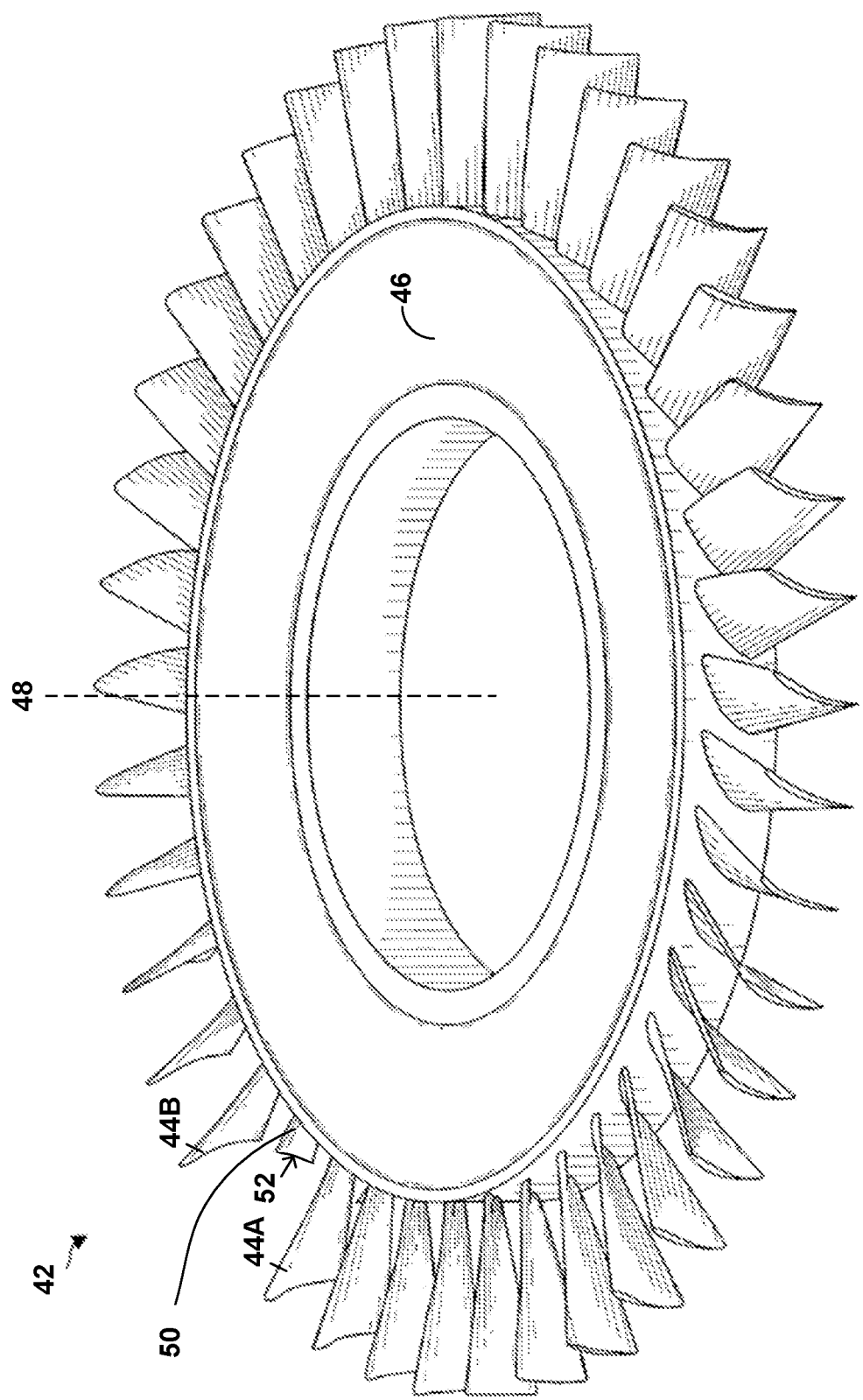
FIG. 2 is a conceptual diagram illustrating an example gas turbine blisk including an example partial blade.

FIG. 2 is a conceptual diagram illustrating an example blisk 42. As shown, blisk 42 includes a plurality of blades (such as blades 44A and 44B, collectively, "blades 44") extending in a radial direction from rotor disk 46. Blades 44 of blisk 42 are evenly dispersed around the outer circumference of rotor disk 46 and are separated by spaces at the outer surface of rotor disk 46. During operation, rotor disk 46 may rotate about its central axis 48.

As shown in FIG. 2, blade 50 may define only a partial blade. For example, blade 50 may have been damaged during operation of blisk 42 in a gas turbine engine, e.g., by corrosion, erosion, a bird strike, impact by another foreign object, or the like. Prior to the damage, partial blade 50 may have had substantially the same size and shape as neighboring blades 44A and 44B. In the illustration of FIG. 2, partial blade 50 is shorter than blades 44A and 44B, which may be a result of a portion of a larger blade being removed because of the damage or mechanical removal of a portion of the blade that included damage. As will be described below, a surface of blade 50 may define a build surface 52 of blisk 42 onto which material is added, e.g., in layers, by an additive manufacturing system to reform a portion of the blade so that blade returns to the size and shape of the other blades on rotor disk 46 such as blades 44A and 44B.

In some examples, component 28 may be an example of blisk 42. As shown conceptually in FIG. 1, component 28 may include a disk 30 (e.g., corresponding to disk 46) and a plurality of integral blades 32 (e.g., corresponding to blades 44 and 50). Component 28, such as a blisk, may be formed of materials including metals and alloys, alone, or with one or more metallic, alloy, or ceramic coatings. In some examples, a blisk may include a titanium alloy or a nickel alloy. Example alloys include Ti—6Al—4V, Ti—6Al—2Sn—4Zr—2Mo, Ti—6Al—2Sn—4Zn—6Mo, and Inconel 718, an alloy including about (by mass) 50-55% Ni, about 17-21% Cr, about 2.8-3.3% Mo, about 4.75-5.5% Nb, about 1% Co, about 0.35% Mn, about 0.2-0.8% Cu, about 0.65-1.15% Al, about 0.3% Ti, about 0.35% Si, about 0.08% C, about 0.015% S, about 0.015% P, about 0.006% B, and a balance Fe. In other examples, component 28 may include another metal or alloy-based component.

Enclosure 12 may substantially enclose (e.g., enclose or nearly enclose) stage 14, cold spray gun 16, material feed 18, gas feed 20, and component 28. Enclosure 12 may maintain a desired atmosphere (e.g., an atmosphere that is substantially inert to the materials from which component 28 and masking layer 34 are formed) around component 28 during the cold spray technique. In some examples, system 10 may not include enclosure 12 and/or stage 14. For example, system 10 may include a handheld device.

In some examples, stage 14 may be configured to selectively position and restrain component 28 in place relative to stage 14 during formation of masking layer 34. In some examples, stage 14 is movable relative to cold spray gun 16. For example, stage 14 may be translatable and/or rotatable along at least one axis to position component 28 relative to cold spray gun 16. Similarly, in some examples, cold spray gun 16 may be movable relative to stage 14 to position cold spray gun 16 relative to component 28.

Material source 22 may include, for example, a hopper or other container containing a plurality of particles of the masking material. The particles may include any suitable particle size. For example, the size range of the particles of the second material may be between about 1 micrometer (μm) and about 60 μm, such as between about 5 μm and about 20 μm. In some examples, the particular size distribution may include a D50 of between about 25 μm and about 40 μm, a D10 of between about 5 μm and about 25 μm, and a D90 of between about 45 μm and about 60 μm. The size range of the particles of the second material may be selected to achieve a selected impact velocity, e.g., a velocity of the particles when impacting a surface of component 28.

In some examples, material source 22 may include a pneumatic hopper operatively coupled to gas source 24 via gas feed 20, such that gas source 24 enables material source 22 to feed the plurality of particles to cold spray gun 16. Computing device 26 may be communicatively coupled to material source 22 and/or material feed 18 to control a rate of material flow from material source 22 to cold spray gun 16 via material feed 18. For example, computing device 26 may control a valve or a feeder system of material feed 18.

The masking material may include any suitable material for masking component 28 during subsequent processing by, for example, directed energy deposition (DED) additive manufacturing, and which can be deposited using cold spraying. For instance, the masking material may include a relatively soft metal or alloy. The relative softness may enable the metal or alloy to be deposited using cold spraying without abrading or otherwise damaging surface 34 of component 28. The masking material may include, for example, elemental copper, a copper alloy (such as bronze), elemental aluminum, an aluminum alloy, elemental gold, a gold alloy, elemental silver, a silver alloy, elemental nickel, a nickel alloy, a refractory metal (such as niobium or molybdenum), a refractory metal alloy (such as a niobium or molybdenum alloy), or the like.

The masking material may also be configured to reflect at least some radiation. For example, during a subsequent repair process, such as a directed energy deposition (DED) additive manufacturing an energy source may be used to heat component 28 or material being added to component 28. The energy source may be a laser, a plasma, an electron beam, or the like. The masking material may be configured to reflect at least some radiation from the energy source and/or may be configured to reflect at least some thermal energy (e.g., infrared radiation) emitted by the energy source, heated material of component 28 and/or the material being added to component 28. In this way, the masking material may help reduce or substantially eliminate heating of portions of component 28 which the masking material masks/covers.

The masking material additionally may be configured to act as a heat sink for heat from component 28. Because the masking material is cold sprayed on surface 36 in masking layer 34, the masking material may be in intimate contact with surface 36 of component 28. Because of this, the interface between component 28 and masking layer 34 may offer lower resistance to heat transfer than an interface between component 28 and other types of masking devices, such as shields that are mechanically attached to component 28. For example, the interface between masking layer 34 and component 28 may have a thermal resistance of more than 5 times less than an interface between surface 36 and other types of masking devices, such as shields that are mechanically attached to component 28. The masking material may have a relatively high thermal conductivity, such as elemental copper, a copper alloy (such as bronze), elemental aluminum, an aluminum alloy, elemental gold, a gold alloy, elemental silver, a silver alloy, or the like. The relatively high thermal conductivity may be, for example, greater than about 70 W/m*K, such as between about 70 and about 400 W/m*K. This cooling of component 28 may help reduce or substantially prevent splatter during the DED additive manufacturing process from sticking to component 28 at unwanted locations.

Further, because masking layer 34 is cold sprayed on surface 36 rather than being thermally sprayed or vapor deposited, masking layer 34 may be more easily removed from surface 36 once the subsequent manufacturing or repair technique is complete. For instance, masking layer 34 may be removed using a chemical process such as etching, an electrolytic process, laser ablation, or the like. For instance, copper and copper alloys may be etched using a solution including ammonium hydroxide, nitric acid, and/or ferric chloride. Aluminum and aluminum alloys may be etched using a solution including hydrochloric acid, nitric acid, and/or hydrofluoric acid. Gold and gold alloys may be etched using a solution including potassium iodide. Silver and silver alloys may be etched using a solution including ferric nitrate and/or nitric acid. Nickel may be etched using hydrogen peroxide, hydrofluoric acid, nitric acid, and/or hydrochloric acid. By selecting a suitable removal process, masking layer 34 may be removed from surface 36 while leaving surface 36 substantially undamaged.

Gas source 24 may include, for example, a source of helium, nitrogen, argon, other substantially inert gas, or mixtures thereof, which may function as carrier of the plurality of particles. Gas source 24 is fluidically coupled to gas feed 20, which may control a flow rate and/or pressure of gas delivered to material source 22 and/or cold spray gun 16. In some examples, gas feed 20 may include a heater to heat the gas. The pressure of the gas in gas source 24 (or gas feed 20) may be sufficient to achieve supersonic velocities of the gas and/or plurality of particles of the masking material at the outlet of a nozzle (e.g., of cold spray gun 16). In some examples, the pressure of the gas may be between about 0.1 megapascals (MPa) and about 6 MPa, such as between about 3.5 MPa and about 5.5 MPa. In some examples, the supersonic velocities may be between about 500 meters per second (m/s) to about 1000 m/s.

Cold spray gun 16 may be configured to entrain the plurality of particles of the masking material from material source 22 in the flow of gas from gas source 24 through a nozzle. The nozzle may accelerate the gas and plurality of particles to high velocities. The resultant high velocity particle stream 29 may be directed toward surface 36 of substrate 30 of component 28. Without limiting the description to a specific theory, the high velocity of the plurality of particles may be sufficient to cause plastic deformation of the particles upon impact with surface 36 of substrate 30. This process is repeated as a plurality of particles attach to surface 36 and/or other attached particles defining a masking layer 34.

System 10 may be configured to control relative movement 27 of high velocity particle stream 29 with respect to surface 34 of substrate 30 to form masking layer 34. For example, directing high velocity particle stream 29 toward substrate 30 may result in deposition of the plurality of particles on surface 36 of substrate 30 and/or a surface of masking layer 34. As illustrated in FIG. 1, the plurality of particles may accumulate to form masking layer 34. For example, the high velocity particle stream 29 may be moved over surface 36 until a sufficient amount of the masking material has accumulated to define masking layer 34.

Computing device 26 may include, for example, a desktop computer, a laptop computer, a tablet, a workstation, a server, a mainframe, a cloud computing system, or the like. Computing device 26 may include or may be one or more processors or processing circuitry, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some examples, the functionality of computing device 26 may be provided within dedicated hardware and/or software modules.

Computing device 26 is configured to control operation of system 10, including, for example, stage 14, cold spray gun 16, material feed 18, gas feed 20, material source 22, and/or gas source 24. Computing device 26 may be communicatively coupled to at least one of stage 14, cold spray gun 16, material feed 18, gas feed 20, material source 22, and/or gas source 24 using respective communication connections. Such connections may be wireless and/or wired connections.

Computing device 26 may be configured to control operation of stage 14 and/or cold spray gun 16 to position component 28 relative to cold spray gun 16. For example, as described above, computing device 26 may control stage 14 and/or cold spray gun 16 to translate and/or rotate along at least one axis to position component 28 relative to cold spray gun 16.

Computing device 26 may control at least one of the feed rate of the plurality of particles from material source 22, pressure of gas source 24, flow rate of the gas through gas feed 24, the relative movement 27 of high velocity particle stream 29 relative to composite component 28, a distance between cold spray gun 16 and surface 36, the angle of high velocity particle stream 29 relative to surface 36, or tool path. The tool path may include the width of the overlap between adjacent passes of the high velocity particle stream 29 and the velocity of cold spray gun 16 relative to surface 36. Computing device 26 may control at least one of these parameters to control the amount of material added to component 28 at a given time and location to define masking layer 34. In some examples, cold spray gun 16 may be scanned (e.g., translated) relative to surface 36, and the masking material may be accumulate in a general shape corresponding to the scanned path.

In accordance with examples of this disclosure, system 10 may be used to form masking layer 34 on surface 36 of component 38. Material source 22 may hold a powder including the masking material, which is provided to cold spray gun 16 via material feed 18. The powder including the masking material may be entrained in gas from gas source 24. Computing device 26 may be configured to control gas source 24, material source 22, gas feed 20, and/or material feed 18 to control output of the masking material by cold spray gun 16.

Computing device 26 also may be configured to control stage 14 and/or cold spray gun 16 to control the location(s) at which high velocity particle stream 29 impacts surface 36. For example, computing device 26 may control stage 14 and/or cold spray gun 16 to cause component 28 to translate relative to cold spray gun 16 and cause high velocity particle stream 29 to scan across surface 36 (e.g., in a raster pattern). Computing device 26 may continue to control cold spray gun 16 until masking layer 34 is formed at a desired thickness (measured substantially perpendicular to surface 36).

Masking layer 34 may cover or mask any desired portion of component 28. For example, in examples in which component 28 includes a blisk in which a damaged blade is being repaired (e.g., blade 50 of FIG. 2), masking layer 34 may cover at least surfaces of the disk (e.g., disk 46 of FIG. 2) that surround and/or face the damaged blade. In some examples, depending on the spacing between adjacent blades, masking layer 34 additionally or alternatively may cover at least some surfaces of adjacent blades (e.g., blades 44A and 44B of FIG. 2). The surfaces which masking layer 34 cover may be selected based on expected splatter and/or heat transfer during the directed energy deposition (DED) additive manufacturing technique.

Once the subsequent manufacturing and/or repair technique is complete, masking layer 34 may be removed. Since masking layer 34 is cold sprayed on surface 36, masking layer 34 may be removed more easily than, e.g., a masking layer that is thermally sprayed on a surface, because cold spraying does not melt surface 36. For instance, masking layer 34 may be removed using a chemical process such as etching, an electrolytic process, laser ablation, or the like. By selecting a suitable removal process, masking layer 34 may be removed from surface 36 while leaving surface 36 substantially undamaged.

Figure 3:
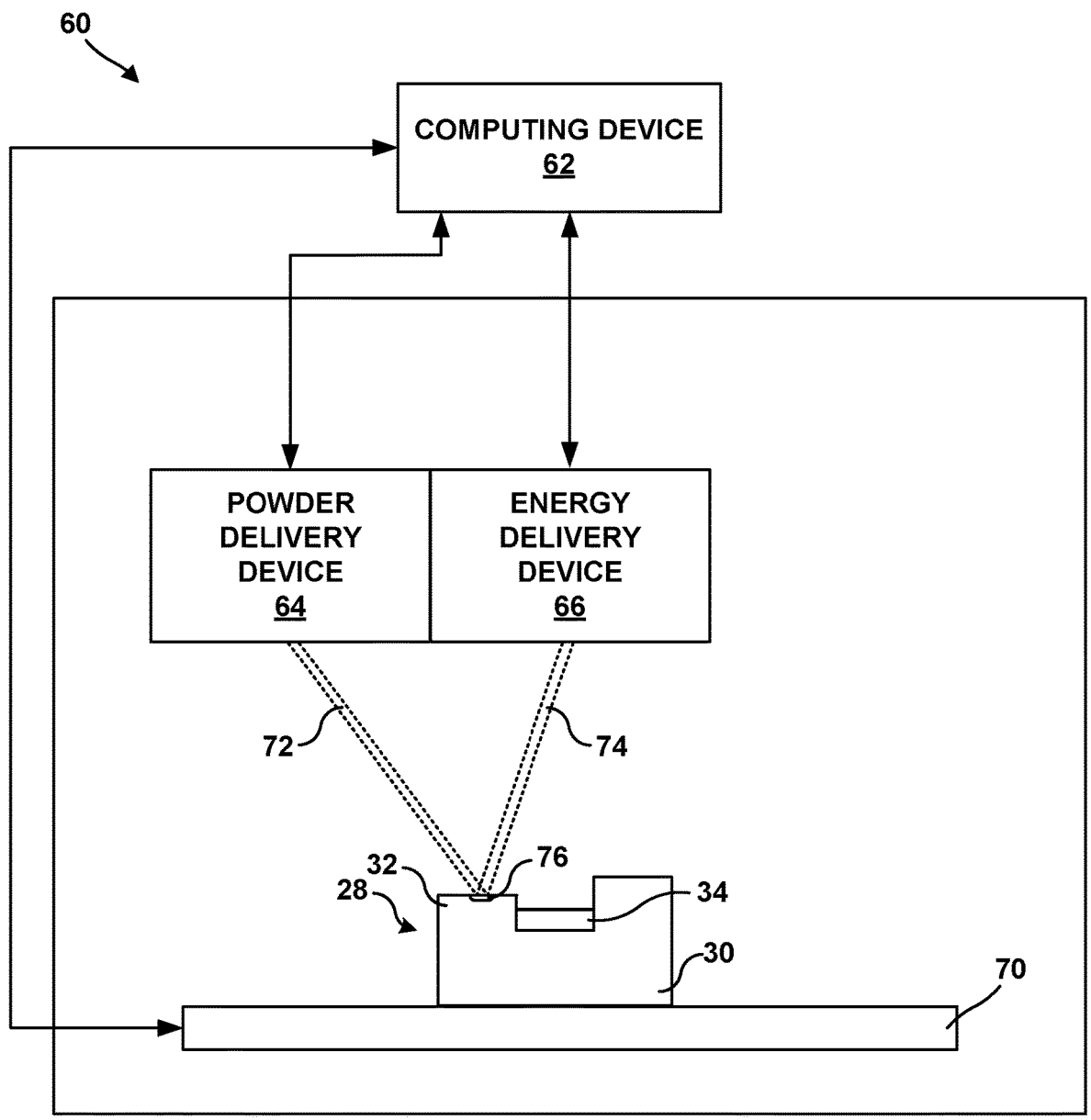
FIG. 3 is a conceptual block diagram illustrating an example system for forming a component and/or repairing a damaged component using a directed energy deposition additive manufacturing technique.

FIG. 3 is a conceptual block diagram illustrating an example system 60 for repairing a damaged component using directed energy deposition additive manufacturing. In the example illustrated in FIG. 3, system 60 includes a computing device 62, a powder delivery device 64, an energy delivery device 66, and a stage 70. Computing device 62 is operably connected to powder delivery device 64, energy delivery device 66, and stage 70.

In some examples, stage 70 is movable relative to energy delivery device 66 and/or energy delivery device 66 is movable relative to stage 70. Similarly, stage 70 may be movable relative to powder delivery device 64 and/or powder delivery device 64 may be movable relative to stage 70. For example, stage 70 may be translatable and/or rotatable along at least one axis to position component 28 relative to energy delivery device 66 and/or powder delivery device 64. Similarly, energy delivery device 66 and/or powder delivery device 64 may be translatable and/or rotatable along at least one axis to position energy delivery device 66 and/or powder delivery device 64, respectively, relative to component 28. Stage 70 may be configured to selectively position and restrain component 28 in place relative to stage 70 during manufacturing and/or repair of component 28.

Powder delivery device 64 may be configured to deliver a flow of material 72 to selected locations of component 28 being formed and/or repaired. At least some of the material may impact a melt pool 76 in component 28. The material that impacts melt pool 76 may be joined to component 28. In some examples, the material may be supplied by powder delivery device 64 in powder form.

In some examples, system 60 may be a blown powder directed energy deposition additive manufacturing system. In some such systems, powder delivery device 64 may deliver the powder adjacent to the surface of component 28 by blowing the powder in a flow of material 72 adjacent to the surface, e.g., as a mixture of the powder with a gas carrier. In some examples, powder delivery device 64 thus may be fluidically coupled to a powder source and a gas source, and powder delivery device 64 may include one or more nozzles or other mechanisms for directing the powder to a particular location. In some examples, powder delivery device 64 may be mechanically coupled or attached to energy delivery device 66 to facilitate delivery of powder and energy for forming melt 76 pool to substantially the same location adjacent to component 28.

In other examples, system 60 may be a powder bed additive manufacturing system. In some such examples, powder delivery device 64 may deliver the powder adjacent to the surface of component 28 by spreading the powder on the surface of component 28, such that the powder rests on the surface prior to portions of the powder and/or component 28 being heated. In some examples of a powder bed additive manufacturing system, powder delivery device 64 may include a device that spreads the powder or can otherwise manipulate the powder to move the powder within system 60.

Energy delivery device 66 may include an energy source, such as a laser source, an electron beam source, plasma source, or another source of energy that delivers energy 74 configured to be absorbed by component 28 to form melt pool 76 and/or be absorbed by the powder to be added to component 28. Example laser sources include a CO laser, a $CO_2$ laser, a Nd:YAG laser, or the like. In some examples, the energy source may be selected to provide energy 74 with a predetermined wavelength or wavelength spectrum that may be absorbed by component 28 and/or the powder material to be added to component 28 during the additive manufacturing technique.

In some examples, energy delivery device 66 also includes an energy delivery head, which is operatively connected to the energy source. The energy delivery head may aim, focus, or direct the energy toward predetermined positions at or adjacent to a surface of component 28 during the additive manufacturing technique. As described above, in some examples, the energy delivery head may be movable in at least one dimension (e.g., translatable and/or rotatable) under control of computing device 62 to direct the energy toward a selected location at or adjacent to a surface of component 28.

Computing device 62 is configured to control components of system 60 and may include, for example, a desktop computer, a laptop computer, a workstation, a server, a mainframe, a cloud computing system, or the like. Computing device 62 is configured to control operation of system 60, including, for example, powder delivery device 64, energy delivery device 66, and/or stage 70. Computing device 62 may be communicatively coupled to powder delivery device 64, energy delivery device 66, and/or stage 70 using respective communication connections. In some examples, the communication connections may include network links, such as Ethernet, ATM, or other network connections. Such connections may be wireless and/or wired connections. In other examples, the communication connections may include other types of device connections, such as USB, IEEE 1394, or the like.

Computing device 62 may be configured to control operation of powder delivery device 64, energy delivery device 66, and/or stage 70 to position component 28 relative to powder delivery device 64, energy delivery device 66, and/or stage 70. For example, as described above, computing device 62 may control stage 70 and powder delivery device 64, and/or energy delivery device 66 to translate and/or rotate along at least one axis to position component 28 relative to powder delivery device 64 and/or energy delivery device 66. Positioning component 28 relative to powder delivery device 64 and/or energy delivery device 66 may include positioning a predetermined surface (e.g., a surface to which material is to be added) of component 28 in a predetermined orientation relative to powder delivery device 64 and/or energy delivery device 66.

Computing device 62 may be configured to control system 60 to deposit layers of material to form and/or repair component 28. Component 28 in FIG. 3 is simplified in geometry and the number of layers compared to many components formed and/or repaired using additive manufacturing techniques.

To form and/or repair component 28, computing device 62 may control powder delivery device 64 and energy delivery device 66 to form, on a surface of component 28, a first layer of material, a second layer of material, and as many more layers of material necessary to define a desired shape of component 28 using an additive manufacturing technique. Computing device 62 may control energy delivery device 66 to deliver energy 74 to a volume at or near the surface to form melt pool 76. For example, computing device 62 may control the relative position of energy delivery device 66 and stage 70 to direct energy to the volume. Computing device 62 also may control powder delivery device 64 to deliver powder to melt pool 76. For example, computing device 62 may control the relative position of powder delivery device 64 and stage 70 to direct powder at or on to melt pool 76. Computing device 62 may control energy delivery device 66 and/or stage 70 to scan energy 74 across the portion of component 28 to which material is to be added, which causes melt pool 76 to scan across the portion of component 28 to which material is to be added. Computing device 62 also may control powder delivery device 64 and/or stage 70 to scan flow of material 72 across the portion of component 28 to which material is to be added to deliver powder to melt pool 76 and add material to component 28.

Due to the delivery of energy to component 28 by energy delivery device 66, melt pool 76 and adjacent portions of component 28 are heated. Heat may transfer outwards from melt pool 76 and be transferred by radiation or convection from energy 74 to other portions of component 28. As described above, masking layer 34 may be formed from a metal or alloy with relatively high thermal conductivity, and so act as a heat sink for heat transferred from component 28. Additionally, masking layer 34 may be formed from a metal or alloy that is reflective to thermal energy, such as IR radiation, and may reflect radiative heat from energy 74 away from masked portions of component 28.

Further, since powder delivery device 64 delivers powder to melt pool 76 as a flow of material 72, some powder may deflect from melt pool 76 or the surface of component 28 that surrounds melt pool 76. Masking layer 34 may prevent or substantially reduce instances of this deflected powder sticking to undesired portions of component 28.

Figure 4:
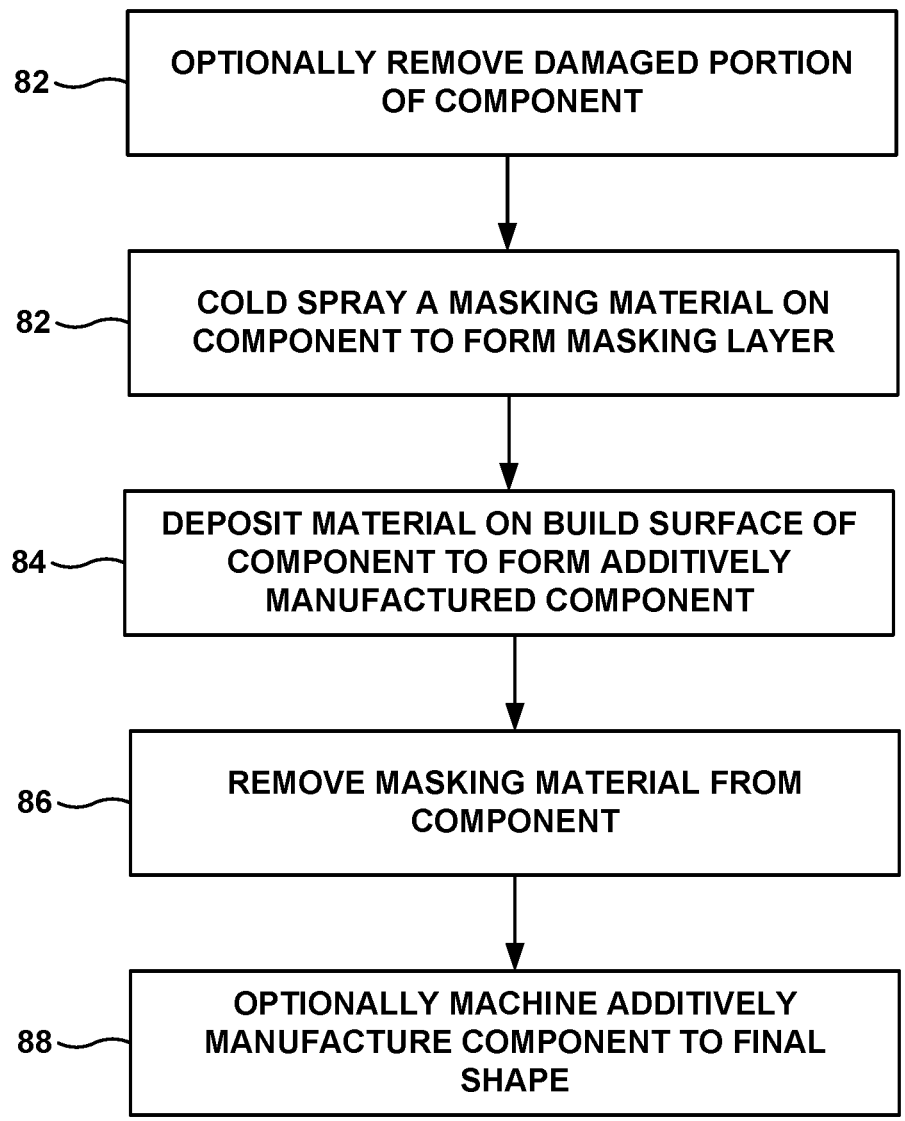
FIG. 4 is a flow diagram illustrating an example technique for repairing a component after cold spraying a masking material on a surface of a substrate to form a masking layer.

FIG. 4 is a flow diagram illustrating an example technique for repairing a component after cold spraying a masking material on a surface of a substrate to form a masking layer. The technique of FIG. 4 will be described with reference to system 10 of FIG. 1 and system 60 of FIG. 3, although the technique of FIG. 4 may be performed using other systems.

The technique of FIG. 4 optionally includes removing a damaged portion of component 28 (80). For example, in some repair techniques, a damaged portion of component 28, such as a damaged portion of a blade of a blisk (e.g., blade 50 of FIG. 2) may be removed prior to adding material to repair component 28. The damaged portion of component 28 may be removed using any suitable technique including mechanical removal (e.g., grinding, cutting, or the like), laser cutting, chemical removal (e.g., etching), or the like. Removing damaged portion of component 28 may define a repair or build surface (e.g., build surface 52 of FIG. 2).

The technique illustrated in FIG. 4 also includes cold spraying, using system 10, a masking material on to at least a portion of surface 36 of substrate 30 of component 28 to form a masking layer 34 (82). As discussed above in reference to FIG. 1, cold spraying includes using a cold spray gun 16 and gas source 24 to accelerate particles of the masking material from a material source 22 toward surface 36 of substrate 30 without melting the particles. The particles of the masking material may contact surface 36 at velocities sufficient to cause plastic deformation of the particles and result in attachment or bonding of the particles to surface 36 and/or other attached particles defining surface 36. The cold spraying of masking material may be directed to any surfaces for which masking is desired, e.g., any surface adjacent to a build surface or repair surface to which material will be added during subsequent processing. As an example, masking material may be cold sprayed on the remaining portion of blade 50 (aside from build surface 52), on surface of adjacent blades 44A and/or 44B that face blade 50, and/or on surfaces of disk 46 surrounding blade 50.

Once masking layer 34 deposited at desired positions of component 28 (e.g., around partial blade 50 in examples in which component 28 is a blisk 42), system 60 may be used to deposit material on a build surface to form a repaired portion of component 28 (84). System 60 may build the repaired portion of component 28 on the build surface using a DED process such as that described above with regard to system 60 of FIG. 3. For example, computing device 62 may control energy delivery device 66 to delivery energy 74 to selected locations of the build surface to form melt pool 76 and may control system 60 (e.g., powder delivery device 64) to deliver flow of material 72 to melt pool 76. The material delivered to melt pool 76 may subsequently cool (e.g., once energy 74 is scanned to a different position on the build surface to form a layer of the deposited material. One or more successive layers of material may be built up on the build surface using this process to form the repaired portion of component 28 (or some approximation of the desired repaired portion 54). Due to the potentially complex geometry of the repaired portion of component 28, the repaired portion may be wholly or partly formed using additively manufacturing techniques such as a DED process. Other suitable AM techniques that may be employed include powder bed fusion techniques, hybrid deposition machine techniques (e.g., using both additive/subtractive steps), or fused filament fabrication techniques (e.g., using sinterable metallic powder loaded filament).

Masking layer 34 may remain on the selected portions of component 28 during the DED process. Once the repaired portion of component 28 is formed, masking layer 34 may be removed from component 28 (86). As described above, masking layer 34 may be removed chemically (e.g., by etching), electrolytically, mechanically, using laser ablation, or the like. In some implementations, after masking layer 34 is removed, the repaired portion of component 28 may then be optionally machined so that the resulting repaired portion exhibits the desired geometry (88).

Various examples have been described. These and other examples are within the scope of the following claims.

What is claimed is:

1. A method comprising:
    cold spraying a masking material on selected locations of a component to form a masking layer, wherein the masking material comprises a metal or alloy;
    additively manufacturing an additively manufactured portion of the component at locations at which the masking layer is not present; and
    removing the masking layer from the component.

2. The method of claim 1, wherein cold spraying the masking material comprises accelerating particles of the masking material toward the surface without melting the particles.

3. The method of claim 1, wherein the metal or alloy is reflective to infrared radiation.

4. The method of claim 1, wherein the metal or alloy exhibits a thermal conductivity of at least 70 W/m*K.

5. The method of claim 1, wherein the metal or alloy comprises at least one of elemental copper, a copper alloy, elemental aluminum, an aluminum alloy, elemental gold, a gold alloy, elemental silver, a silver alloy, elemental nickel, a nickel alloy, a refractory metal, a refractory metal alloy, or the like.

6. The method of claim 1, wherein additively manufacturing the additively manufactured portion comprises directed energy deposition additive manufacturing the additively manufactured portion.

7. The method of claim 1, further comprising, prior to cold spraying the masking material, removing a damaged portion of the component to define a build surface, and wherein additively manufacturing the additively manufactured portion of the component at locations at which the masking layer is not present comprises additively manufacturing the additively manufactured portion of the component at the build surface.

8. The method of claim 1, wherein the component comprises a blisk.

9. The method of claim 1, wherein removing the masking layer comprises at least one of etching the masking layer, electrolytically removing the masking layer, or laser ablating the masking layer.

* * * * *